(12) United States Patent
Allen et al.

(10) Patent No.: US 7,809,739 B2
(45) Date of Patent: Oct. 5, 2010

(54) APPLICATION CONFIGURATION IN DISTRIBUTED STORAGE SYSTEMS

(75) Inventors: James Patrick Allen, Austin, TX (US); Matthew Albert Huras, Ajax (CA); Thomas Stanley Mathews, Austin, TX (US); Lance Warren Russell, Rosanky, TX (US)

(73) Assignee: International Business Machines Corporation, Armonk, NY (US)

( * ) Notice: Subject to any disclaimer, the term of this patent is extended or adjusted under 35 U.S.C. 154(b) by 765 days.

(21) Appl. No.: 11/198,592

(22) Filed: Aug. 5, 2005

(65) Prior Publication Data

US 2007/0038678 A1 Feb. 15, 2007

(51) Int. Cl.
*G06F 7/00* (2006.01)
(52) U.S. Cl. ............... 707/758; 707/812; 710/8; 710/15; 710/36; 710/52; 710/56
(58) Field of Classification Search ............ None
See application file for complete search history.

(56) References Cited

U.S. PATENT DOCUMENTS

| 6,253,240 B1 | 6/2001 | Axberg et al. | |
| 6,314,460 B1 | 11/2001 | Knight et al. | |
| 6,640,278 B1 * | 10/2003 | Nolan et al. | 711/6 |
| 7,010,528 B2 * | 3/2006 | Curran et al. | 707/8 |
| 7,194,594 B2 * | 3/2007 | Asami et al. | 711/170 |
| 2003/0236884 A1 * | 12/2003 | Yamamoto et al. | 709/225 |

OTHER PUBLICATIONS

Kirkman et al., Dynamic Storage Pool Manager, IBM Technical Disclosure Bulletin, Sep. 1985, pp. 1684-1686.
Manners, DC., Method for Dynamically Managing Virtual Storage Pools, IBM Technical Disclosure Bullentin, Mar. 1993, pp. 147-148.

* cited by examiner

*Primary Examiner*—Tim T. Vo
*Assistant Examiner*—Hasanul Mobin
(74) *Attorney, Agent, or Firm*—Dillon & Yudell LLP

(57) ABSTRACT

A method and system for enabling dynamic matching of storage utilization characteristics of a host system application with the characteristics of the available storage pools of an attached distributed storage system, in order to provide an optimal match between the application and selected storage pool. An abstraction manager is provided, enhanced with a storage device configuration utility/module, which performs a series of tasks to (1) obtain/collect the correct configuration information from each connected storage device or storage pools and/or (2) calculate the configuration information when the information is not readily available. The storage device configuration module then normalizes, collates and matches the configuration information to the various applications running on the host system and/or outputs the information to a user/administrator of the host system via a software interface. By using the collected/calculated configuration information, applications are assigned to an optimal storage pool in an intelligent and efficient manner.

20 Claims, 3 Drawing Sheets

APPLICATION CONFIGURATION IN DISTRIBUTED STORAGE SYSTEMS

BACKGROUND OF THE INVENTION

1. Technical Field

The present invention relates generally to computer systems and in particular to distributed storage systems. Still more particularly, the present invention relates to a method and system for dynamically configuring distributed storage systems.

2. Description of the Related Art

Over the last several years, significant changes have occurred in how persistent storage devices are attached to computer systems. With the introduction of Storage Area Network (SAN) and Network Attached Storage (NAS) technologies, storage devices have evolved from locally attached, low capability, passive devices to remotely attached, high capability (intelligent), active devices that are capable of deploying vast file systems and file sets. The remotely-attached intelligent storage devices are referred to herein as "storage servers," while the computer system to which they are attached are referred to as "hosts." These devices are interconnected via a network interface and collectively referred to as distributed storage systems.

One complication present within a distributed storage environment is that applications which execute on the host, particularly databases and file systems, are not cognizant of the type of storage that they are utilizing. Hosts typically have multiple storage connections. For example, a single host may be connected to one or more storage servers and one or more locally-attached disk drives. Then, a system administrator on the host creates virtual storage pools from among these storage connections. The administrator may create one pool comprising storage from a locally attached disk and storage from one of the storage servers, another pool comprising storage from a different locally attached disk, and yet another pool comprising two distributed storage servers. The administrator then assigns applications to the respective storage pools.

One problem with this approach is that, in order to complete the assignment in an optimal manner, the administrator has to match the storage utilization characteristics of the application with the characteristics of the pool. To complete this match, certain configuration information on the various storage pools needs to be obtained. However, with conventional implementations, the configuration information is generally not obtainable for even a single storage connection, and even more unavailable for a virtualized storage pool.

SUMMARY OF THE INVENTION

Disclosed is a method and system for enabling dynamic matching of storage utilization characteristics of a host system application with the characteristics of the available storage pools of an attached distributed storage system, in order to provide an optimal match between the application and selected storage pool. An abstraction manager is provided, enhanced with a storage device configuration utility/module, which performs a series of tasks to (1) obtain/collect the correct configuration information from each connected storage device or storage pools and/or (2) calculate the configuration information when the information is not readily available. The storage device configuration module then normalizes, collates and matches the configuration information to the various applications running on the host system and/or outputs the information to a user/administrator of the host system via a software interface. By using the collected/calculated configuration information, applications are assigned to an optimal storage pool in an intelligent and efficient manner.

The above as well as additional objectives, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF AN ILLUSTRATIVE EMBODIMENT

The present invention provides a method and system for enabling dynamic matching of storage utilization characteristics of a host system application with the characteristics of the available storage pools of a distributed storage system, in order to provide an optimal match between the application and selected storage pool. An abstraction manager (described below) is enhanced with a storage device configuration utility/module, which performs a series of tasks, including obtaining/collecting the correct configuration information from each connected storage device (or storage pools) and/or calculating the configuration information when the information is not readily available. The storage device configuration module then normalizes, collates and matches the configuration information to the various applications running on the host system and/or outputs the information to a user of the host system via a software interface. Using the collected/calculated configuration information, applications may then be assigned (manually by the user or automatically by the abstraction manager) to the correct storage pool, in an intelligent and efficient manner. The abstraction manager and device configuration module are described in greater details below.

Implementation of the invention occurs within a distributed storage environment that includes both local and remote storage according to the illustrative embodiment. Of course, it is understood that the environment may comprise only one type of storage, e.g., remote storage, and the functional features described below apply regardless of the actual configuration of the storage environment. Further, specific implementation of the invention is carried out within a host system in the described embodiment. An exemplary distributed storage environment and host system are now described to provide a context within which the inventive features may advantageously be implemented.

Figure 1:
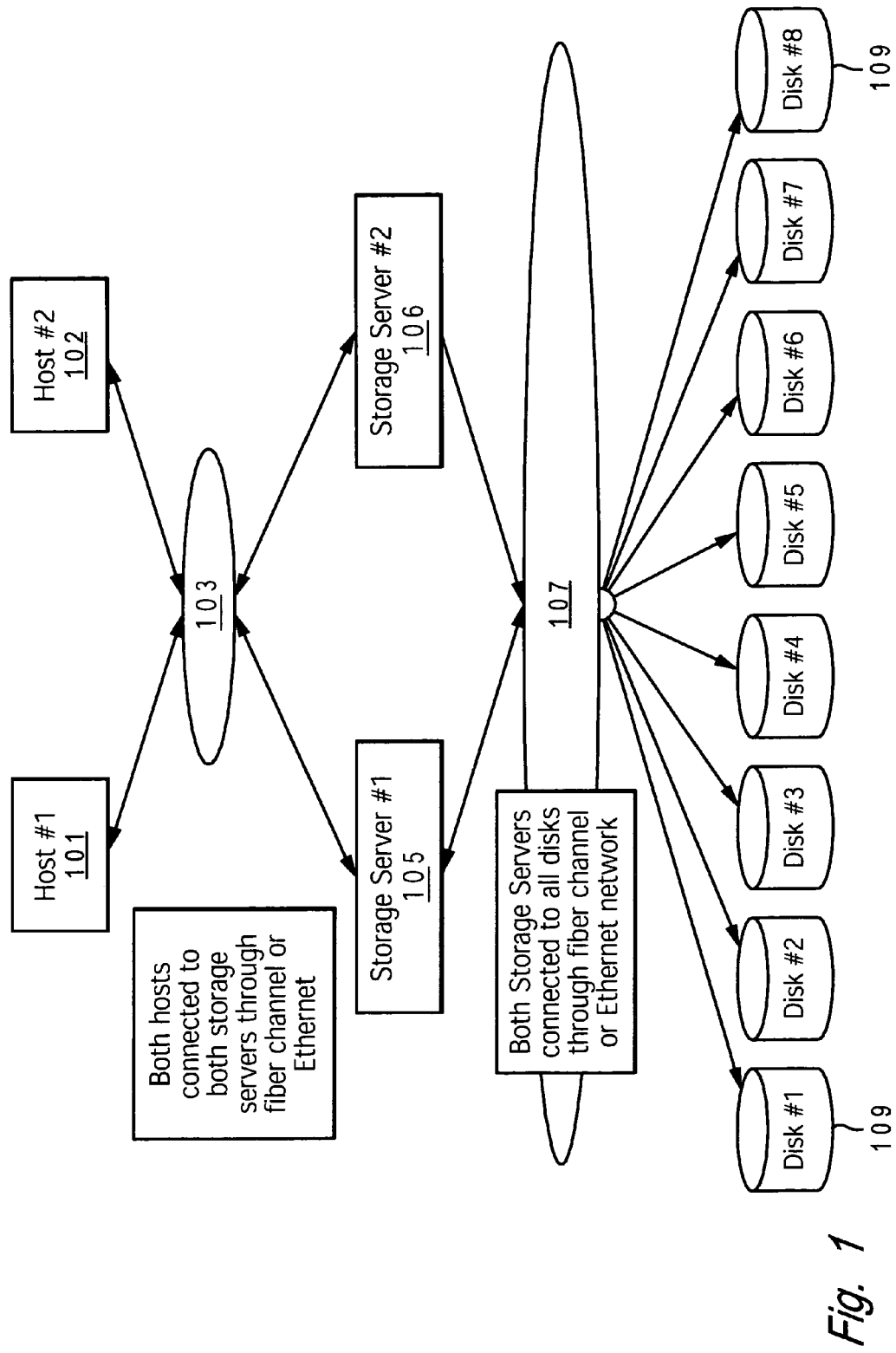
FIG. 1 is a diagram of a distributed network having distributed storage connected to host systems, within which embodiments of the invention may advantageously be implemented.

Turning now to the Figures, FIG. 1 illustrates an exemplary embodiment of the topology of a distributed storage system, within which the various features of the invention may advantageously be implemented. As shown by FIG. 1, distributed storage system comprises one or more host systems (for example, host systems 101 and 102) connected to one or more storage servers (for example, servers 105 and 106) via a first internal/external network 103. Storage servers 105/106 are themselves connected to persistent storage devices (disks) 109 via a second internal/external network 107. Both first network 103 and second network 107 comprise some combination of fiber channels or Ethernet or other network structure based on system design.

While FIG. 1 illustrates only two hosts (101 and 102) connected to two storage servers (105 and 106) using fiber channel, it is understood that any number of host systems and/or storage systems may exist within the distributed storage system. Also, while storage servers 105/106 are themselves connected to eight disks (or persistent storage devices) via another fiber channel network, the number of disks is variable and not limited by the illustration. Finally, the invention is independent of the physical network media connecting the components. For example, all of the fiber channel networks could be replaced with Ethernet networks or other network connection medium.

Figure 2:
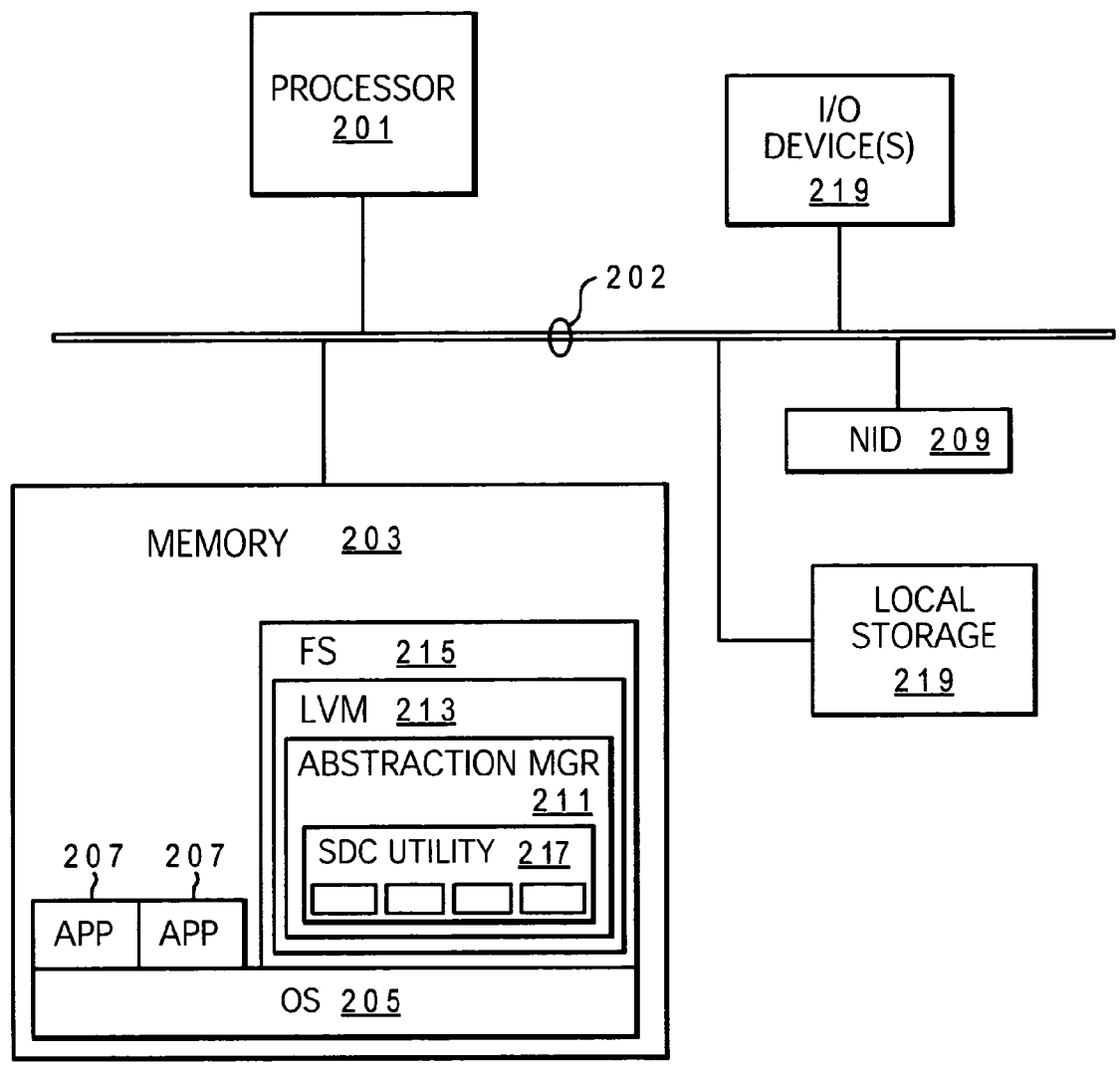
FIG. 2 is a block diagram of an exemplary host system with software utility/modules for performing the configuration data retrieval from distributed storage, according to one embodiment of the invention.

With reference now to FIG. 2, there is illustrated a block diagram representation of an exemplary host system, which for illustration is assumed to be host system 101. Host system 101 is a typical computer system that includes a processor 201 connected to local memory 203 via a system bus 202. Within local memory 203 are software components, namely operating system (OS) 205 and application programs 207. According to the invention, host system 101 also includes the required hardware (e.g., network interface device, NID 209) and software components to enable connection to and communication with a distributed storage network.

To enable access to a distributed storage network, applications 207, such as databases and file systems (not specifically shown), execute on the host system 101 accessing virtualized storage pools (not shown). These storage pools are constructed by the hosts system(s) using file systems 215 and/or logical volume managers 213 (associated with or component parts of the OS 205) and are physically backed by actual storage residing at one or more of the storage servers or at local storage 219, directly attached to the host system 101. For purposes of the invention, it is understood that some operating systems do not have an explicit volume manager but rather combine that function with the file system. The illustrative embodiment provides LVM 213, but the invention is generally applicable to either configuration.

As applications issue input/output (I/O) operations to the storage pools, these requests are passed through the host file system 215, host logical volume manager 213, and host device drivers 214. These requests are then converted to an appropriate form and transmitted to the appropriate locally-attached or remote storage device. For purposes of the invention, this described processing pipeline (i.e., host file system, host logical volume manager, host device driver) along with storage network protocol and storage server modules are collectively referred to as the distributed storage system software stack.

According to one embodiment of the invention, a particular module is provided in each host system's storage software stack to interface directly with each physical storage device in the storage pool and present a logical contiguous view of the storage pool to applications running on the host system. In some embodiments, this module is a provided within (or associated with) the host logical volume manager, while in other systems that do not have logical volume managers, the functionality provided by the module is integrated into the host's file system. Regardless of the implementation, this module is generally (or collectively) referred to as the abstraction manager.

As illustrated by FIG. 2, host system 101 includes abstraction manager 211, which serves as the host's system's point of data collection and configuration for the entire distributed storage. While illustrated as a separate module (block), abstraction manager 211 may be a component of or associated with OS 125 and specifically associated with FS 215 or with LVM 213, where an explicit LVM is provided.

According to the described embodiment, abstraction manager 211 is the one host component that has both (1) knowledge of the physical device composition of the pools and (2) ability to interact with the software modules controlling those devices. Abstraction manager 211 is therefore the one point in the stack that knows the physical composition of the storage pools which the applications interface with, and abstraction manager 211 is thus the module that is able to efficiently collect and calculate the required data.

The abstraction manager interfaces with each storage device via respective device drivers. The abstraction manager converts references from logical partitions into the corresponding actual physical devices. Within the described embodiments, the primary functions of the abstraction manager are gathering, collecting and collating the configuration information and presenting the information to the applications and host system administrator/user. Notably, the abstraction manager does not itself utilize the retrieved or calculated configuration information. Rather, the abstraction manager simply collects and calculates the data, which reflects the characteristics of a particular storage pool. Applications and administrators may then utilize this data to match the characteristics of the data to the requirements of a particular application. That is, the applications and administrators utilize the data to determine the best storage pool (from among all available pools) to use for the particular application.

To complete the above referenced functions of the described embodiment of the invention, the abstraction manager is enhanced with an additional module that collects, calculates and distributes the requisite configuration information of the various storage devices. For ease of description herein, that module is referred to as the storage device configuration (SDC) module. As described in greater details below, the SDC module also provides a software interface, which is utilized by both the applications and the user(s) to match storage pools with specific applications and vice versa. Thus, as an example, applications may query the interface to automatically match functions to the appropriate storage pool and/or the information can be presented to the system administrators for manually matching functions to storage pools.

FIG. 2 illustrates abstraction manager 211 having therein storage device configuration (SDC) utility/module 213 which, along with the other software components executing on the host system, enables the various functional features of the invention. SDC module 213 performs two primary functions: (1) SDC module 213 generates queries that enable retrieval of configuration information from the storage devices within the distributed storage system; and (2) SDC module 213 calculates and receives input of other data that is not collected from the storage device.

The configuration information is then utilized in determining which storage device to allocate to specific application processes. Examples of configuration information obtained about the storage pools by SDC module 213 and utilized to match the storage pools to specific applications (or applications to storage pools) are the following: the maximum transfer size that the pool can handle in any single operation; the average total throughput (MB/sec) that the pool can sustain; and the average latency (e.g., in seconds) that can be expected from a single I/O operation on the pool.

The illustrative embodiment of the invention provides a method and/or system by which applications are able to obtain this data and utilize this data to configure the particular application for optimal use of the storage pools without the intervention of an administrator. Implementation of the invention includes providing the functionality of the SDC module into the abstraction manager to enable the above and other configuration information to be made available programmatically to the applications.

Figure 3:
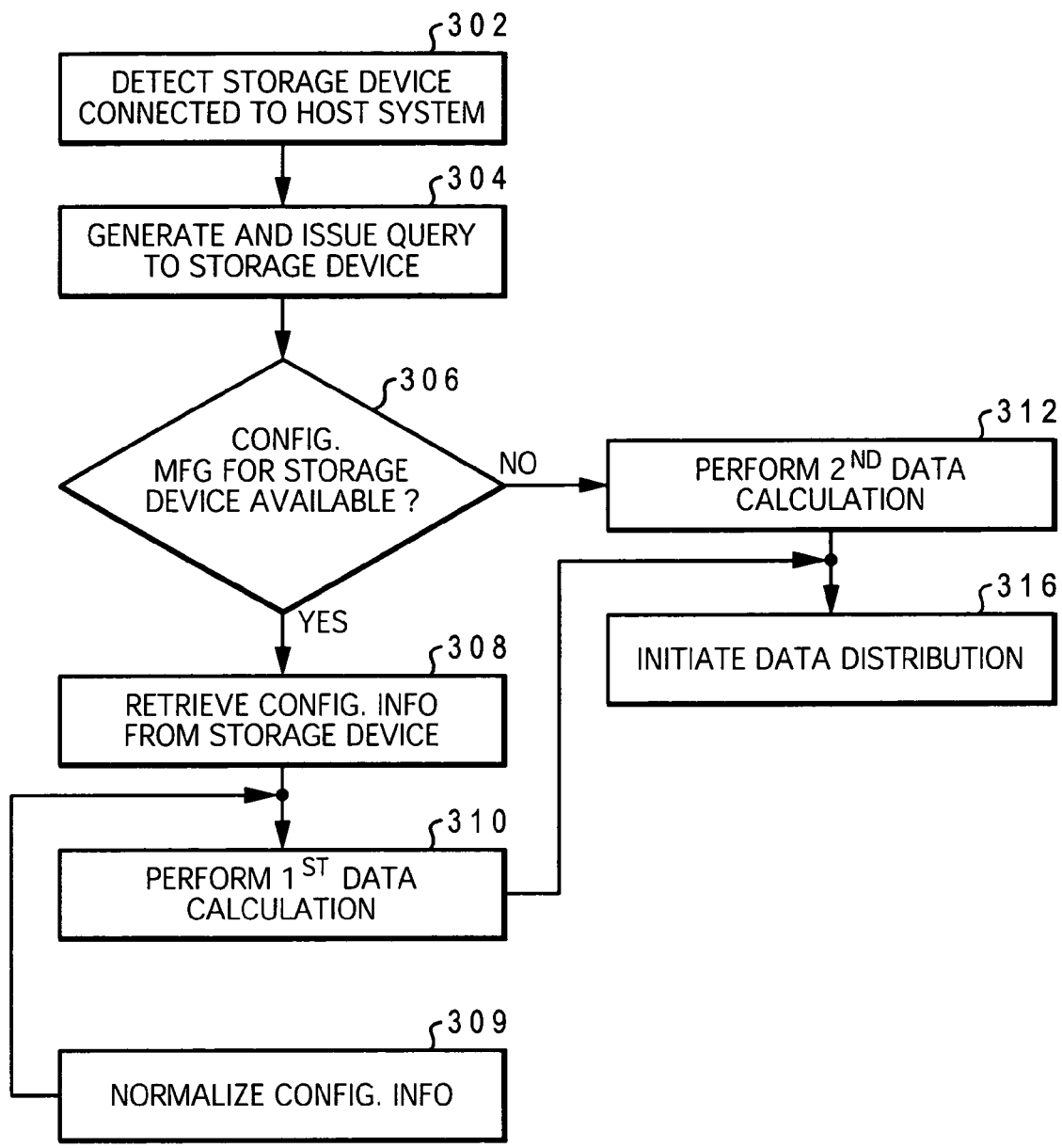
FIG. 3 is a flow diagram illustrating the various process of collecting and/or calculating, then collating configuration data via the device configuration utility of an abstraction manager in accordance with one embodiment of the invention.

The processing completed by the abstraction manager 211 (particularly by the SDC module 213) includes three main operations, namely, data collection, data calculation, and data distribution. Each operation is now presented/described in delineated sections below, loosely following the process flow chart of FIG. 3.

Data Collection

Data collection is the primary functions provided by the SDC utility and is automatically initiated once the storage device is connected to the host system, either directly (local storage) or via the network (remote storage). Thus, the process begins at block 302 with the connection of a storage device to the host system. SDC utility generates a query (block 304) to retrieve particular configuration data from the storage device. Notably, while it is anticipated that some information is available for each storage device, the described embodiment of the invention is applicable to configurations in which not all of the configuration information is obtainable even on a single storage device basis. Thus, decision block 306 provides a determination whether the storage device has its configuration information readily available. Assuming that some of the configuration information is obtainable, the SDC utility implements a process of retrieval/collection of the configuration data from the various storage devices, as shown at block 308.

In certain implementations, some information may exist on the storage device but not readily obtainable by a general query. For example, the original equipment manufacturer (or vendor) may configure the storage device with unique configuration data. To address the situations where the information is not directly obtainable from the storage device with a general query, the abstraction manager is further enhanced with device-specific modules for the collection and translation of these unique configuration data.

One function of these device-specific modules is to provide these unique configuration data in a normalized format for use within data calculation and other functions of SDC utility. The data which the SDC utility wishes to collect from the physical devices may not be available and/or may be in a different form than the data collected from other physical devices. For example, a first device may report average latency in 0.001 (thousandths) of a second, a second device reports average latency in 0.0001 (ten-thousandths) of a second, while a third device does not report average latency at all. Given this scenario, device specific modules are created within the SDC utility that recognize, for example, that the desired method of reporting latency is in 0.0001 of a second. The device-specific module for the first device thus converts the latency numbers of the first device to 0.0001 of a second. The device-specific module for the second device does nothing since it is already reporting average latency in the correct norm/format, while the device-specific module for the third device begins timing actual I/Os in 0.0001 of a second so normalized latency numbers may be computed.

For simplicity in the description of the inventive methods, the combination of these device-specific modules and general SDC module, described above, are collectively referred to as SDC utility, which encompasses a generally applicable query/retrieval function across substantially all storage devices.

Data Calculations

SDC utility provides two types of data calculations. The first calculation involves translating information collected from each individual storage device into data applicable to the entire pool (block 310). For example, the maximum transfer size for a pool is calculated to be the minimum of the maximum transfer sizes over all the individual storage devices. Since all of the data reported has to be representative of the pool and not the individual device, all of the data has to go through this calculation step.

The second calculation involves generating data that is not obtainable from an individual storage device or is difficult to extrapolate to a pool basis (step 312). This second calculation is needed if the storage device does not report its configuration information. With this second calculation, the SDC utility abstracts the physical devices into the pool. Then, the abstraction manager translates all application I/O requests directed to the pool into the physical device components of the request. Finally, the abstraction manager forwards the appropriate request to each individual storage device.

One example of data that is generated via the second calculation is average latency for a single I/O operation to the pool. According to one implementation, the invention modifies the abstraction manager to statistically time and track I/O requests to the individual storage devices in order to compute average I/O latencies, average sustained I/O throughput to the pool, and other data associated with the pool and individual devices corresponding thereto.

Data Distribution via Software Interface

Data distribution is provided following data collection and data calculation (block 316). According to the described embodiment, data distribution is completed via a particular software interface within SDC utility that is constructed for the purpose of querying the abstraction manager to obtain the collected and calculated configuration data for a selected storage pool. This interface is accessible to all host system applications with the appropriate permissions, and enables applications to collect the configuration information. Applications are able to query this interface to automatically match functions to the appropriate storage pool.

Additionally, in one embodiment, the configuration information may be presented to the system administrator/user for manually matching functions to storage pools. This latter embodiment involves an output mechanism by which the configuration information is outputted on an output device of the host system once the information is collected, analyzed and translated. The administrator/user then manually selects the storage pools and links the pools to the appropriate applications (and vice versa).

It is important that while an illustrative embodiment of the present invention has been, and will continue to be, described in the context of a fully functional computer system with installed management software, those skilled in the art will appreciate that the software aspects of an illustrative embodiment of the present invention are capable of being distributed as a program product in a variety of forms, and that an illustrative embodiment of the present invention applies equally regardless of the particular type of signal bearing media used to actually carry out the distribution. Examples of signal bearing media include recordable type media such as floppy disks, hard disk drives, CD ROMs, and transmission type media such as digital and analogue communication links.

While the invention has been particularly shown and described with reference to a preferred embodiment, it will be understood by those skilled in the art that various changes in form and detail may be made therein without departing from the spirit and scope of the invention.

What is claimed is:

1. In a host system connected to a distributed storage system and on which executes one or more applications that require storage allocation, a processor-implemented method comprising:
   the processor executing a storage device configuration module within the host system, wherein the storage device configuration module performs the functions of:
   issuing a query from the host system to one or more storage devices connected to the host system for retrieval of configuration information of the one or more storage devices; and
   responsive to receipt of the configuration information:
      determining, at the host system, an optimal allocation of storage devices to an application running on the host system based on an analysis which involves matching characteristics of the configuration information received from the one or more storage devices with known storage and input/output (I/O) requirements of the application; and
      based on the optimal allocation determined by analyzing the configuration information received against the known storage and I/O requirements of the application, automatically assigning, at the host system, specific ones of the one or more storage devices to the application running on the host system;
   wherein the application subsequently access the assigned specific one or more storage devices to complete all subsequent storage and I/O processes of the application;
   wherein specific storage is assigned to specific applications running on the host system based on the received configuration information of the one or more storage devices compared against known I/O and other requirements of the specific applications; and
   wherein the issuing of the query to retrieve the configuration information for use in determining the optimal allocation is automatically initiated when a storage device is connected to the host system and occurs independent of any storage or I/O request being issued by an application executing at the host system.

2. The method of claim 1, further comprising:
   analyzing the configuration information received from the one or more storage devices to determine the optimal allocation of storage devices to the application; and
   wherein said automatically assigning further comprises selecting specific ones of the one or more storage devices that provide said optimal allocation, while other storage devices, which do not provide optimal allocation are not assigned as a storage device to the application.

3. The method of claim 1, further comprising:
   grouping said one or more storage devices into a plurality of pools;
   maintaining, via a management utility of the host component, a knowledge base of (1) a physical device composition of each pool of storage devices and (2) interaction with software modules controlling the storage devices; and
   collecting, calculating and distributing requisite configuration information of each storage device and each pool via a device configuration module of said management utility;
   wherein the configuration information comprises one or more of: a maximum transfer size that each pool can handle in any single operation; an average total throughput that the pool can sustain; and an average latency that can be expected from a single I/O operation on the pool.

4. The method of claim 3, further comprising:
   automatically initiating collection of obtainable configuration information when the storage device is connected to the host system to collect configuration data of the storage device;
   when information which exists on the storage device is unique configuration data that is not readily obtainable be a general query, activating one or more device specific modules for collection and translation of the unique configuration data; and
   when a first device provides at least one of (a) different formats and (b) recording of configuration data in a particular class from a second device, normalizing said configuration data into a pre-established format for recording said configuration data;
   wherein, said device configuration module is enhanced with device specific modules for the collection and translation of device specific data.

5. The method of claim 3, further comprising performing one of two types of data calculations from among:
   translating information collected from each individual storage device into data applicable to the entire pool; and
   when the storage device does not automatically report its configuration information, generating data that is not obtainable from an individual storage device and data that is difficult to extrapolate to a pool basis.

6. The method of claim 4, wherein said normalizing includes allocating as a maximum transfer size for the pool a minimum size from among the maximum transfer sizes over all the individual storage devices within the pool.

7. The method of claim 6, further comprising:
   translating all application I/O requests directed to the pool into its physical device components; and
   forwarding the appropriate request to each individual storage device.

8. The method of claim 1, further comprising:
   statistically timing and tracking I/O requests to the individual storage devices in order to compute storage device characteristics, including average I/O latencies and average sustained I/O throughput to the pool; and
   querying the manager to obtain the collected and calculated configuration data for a selected storage pool.

9. The method of claim 8, further comprising:
   providing an interface for access by applications and system administrators to the configuration data, such that each application is able to query the interface to automatically match functions to the appropriate storage pool;
   presenting the information to the system administrators for manually matching functions to storage pools; and
   automatically assigning permissions to the interface to enable said interface to be accessible to all host system applications with said appropriate permissions.

10. A distributed storage system comprising:
    at least one host system;
    one or more storage devices connected to the at least one host systems and accessible via one or more host storage pools;

a software module that when executed on the at least one host system provides a plurality of functions from among:

issuing a query from the host system to one or more storage devices connected to a host system for configuration information of the one or more storage devices;

collecting device configuration information for each of multiple host storage pools within the distributed storage system; and responsive to receipt of the configuration information:
analyzing, at the host system, the configuration information received from the one or more storage devices and known storage and input/output (I/O) requirements of the application to determine an optimal allocation of storage devices to the application; and
automatically assigning specific ones of the one or more storage devices to an application running on the host system, based on said configuration information and the optimal allocation of storage devices determined for the application;

wherein said automatically assigning further selects specific ones of the one or more storage devices that provide said optimal allocation, while a remaining storage device of the one or more storage devices, which does not provide said optimal allocation is not assigned as a storage device to that application;

wherein the application subsequently access the specific one or more storage devices to complete all subsequent I/O and storage processes of the application;

wherein specific storage is assigned to specific applications running on the host system based on the received configuration information of the one or more storage devices compared against known I/O and other storage requirements of the specific applications;

wherein the issuing of the query to retrieve the configuration information for use in determining the optimal allocation is automatically initiated when a storage device is connected to the host system and occurs independent of any storage or I/O request being issued by an application executing at the host system;

grouping said one or more storage devices into pools;

maintaining, via a management utility of the host component, a knowledge base of (1) a physical device composition of each pool of storage devices and (2) interaction with software modules controlling the storage devices;

collecting, calculating and distributing requisite configuration information of each storage device via a device configuration module of said management utility;

wherein the configuration information comprises one or more of: a maximum transfer size that the pool can handle in any single operation; an average total throughput that the pool can sustain; and an average latency that can be expected from a single I/O operation on the pool;

collecting configuration data of the storage devices by automatically initiating the collection of obtainable configuration information when the storage device is opened and connected to the host system; and when information which exists on the storage device is unique configuration data that is not readily obtainable be a general query, activating one or more device specific modules for collection and translation of the unique configuration data;

when a first device provides at least one of different formats and recording of configuration data in a particular class from a second device, normalizing said configuration data into a pre-established format for recording said configuration data;

wherein, said device configuration module is enhanced with device specific modules for the collection and translation of device specific data; and wherein said normalizing includes allocating as a maximum transfer size for the pool a minimum size from among the maximum transfer sizes over all the individual storage devices within the pool.

11. The distributed storage system of claim 10, further comprising:
one or more storage servers connected to persistent storage devices;
a internal network connecting the host systems to the storage servers;
wherein execution of said software module further provides a plurality of functions comprising:
translating all application I/O requests directed to the pool into its physical device components;
forwarding the appropriate request to each individual storage device;
statistically timing and tracking I/O requests to the individual storage devices in order to compute storage device characteristics, including average I/O latencies and average sustained I/O throughput to the pool; and
querying the manager to obtain the collected and calculated configuration data for a selected storage pool.

12. The distributed storage system of claim 10, wherein execution of the software module provides a plurality of functions comprising:
performing one of two types of data calculations from among: (1) translating information collected from each individual storage device into data applicable to the entire pool; and (2) when the storage device does not automatically report its configuration information to the software module at the host system in response to the query, generating data that is not obtainable from an individual storage device and data that is difficult to extrapolate to a pool basis;
providing an interface for access by applications and system administrators to the configuration data, such that (1) each application is able to query the interface to automatically match functions to the appropriate storage pool;
presenting the information to the system administrators for manually matching functions to storage pools; and
automatically assigning permissions to the interface to enable said interface to be accessible to all host system applications with said appropriate permissions.

13. A computer program product comprising:
a computer recordable medium; and
program code on said computer recordable medium that executes as a device configuration module on a processor of a host system that is connected via a network to a system of storage devices, which program code provides the functions of:
issuing a query from the host system to one or more storage devices connected to the host system for configuration information of the one or more storage devices; and
responsive to receipt of the configuration information:
determining, at the host system, an optimal allocation of storage devices to an application running on the host system based on an analysis of the configuration information received from the one or more storage devices with known storage and input/output (I/O) requirements of the application; and
based on the optimal allocation determined by analyzing the configuration information received with known storage and I/O requirements of the application, automatically assigning, at the host system, specific ones of the one or more storage devices to the application running on the host system;

wherein the application subsequently access the specific one or more storage devices to complete all subsequent I/O and storage processes of the application;

wherein specific storage is assigned to specific applications running on the host system based on the received configuration information of the one or more storage devices compared against known I/O and other storage requirements of the specific applications;

wherein the issuing of the query to retrieve the configuration information for use in determining the optimal allocation is automatically initiated when a storage device is connected to the host system and occurs independent of any storage or I/O request being issued by an application executing at the host system; and wherein the program code is configured to be executed by one or more computers.

14. The computer program product of claim 13, further comprising program code for:

analyzing the configuration information received from the one or more storage devices to determine the optimal allocation of storage devices to the application; and wherein said assigning further comprises selecting specific ones of the one or more storage devices that provide said optimal allocation, while other storage devices, which do not provided optimal allocation are not assigned as a storage device to the application.

15. The computer program product of claim 13, wherein:

said distributed storage system comprises one or more host systems locally connected to persistent storage devices, one or more storage servers connected to persistent storage devices and an internal network connecting the host systems to the storage servers; and said program code comprises code for:

grouping said one or more storage devices into a plurality of storage pools;

maintaining, via a management utility of the host component, a knowledge base of (1) a physical device composition of each pool of storage devices and (2) interaction with software modules controlling the storage devices; and collecting, calculating and distributing requisite configuration information of each storage device via a device configuration module of said management utility;

wherein the configuration information comprises one or more of: a maximum transfer size that each pool can handle in any single operation; an average total throughput that the pool can sustain; and an average latency that can be expected from a single I/O operation on the pool.

16. The computer program product claim 13, further comprising code for:

collecting configuration data of the storage devices by automatically initiating the collection of obtainable configuration information when the storage device is opened and connected to the host system; and when information which exists on the storage device is unique configuration data that is not readily obtainable be a general query, activating one or more device specific modules for collection and translation of the unique configuration data;

when a first device provides at least one of different formats and recording of configuration data in a particular class from a second device, normalizing said configuration data into a pre-established format for recording said configuration data;

wherein, said device configuration module is enhanced with the device specific modules for the collection and translation of device specific data, and wherein said code for normalizing includes code for allocating as a maximum transfer size for the pool a minimum size from among the maximum transfer sizes over all the individual storage devices within the pool.

17. The computer program product of claim 13, further comprising code for performing one of two types of data calculations from among:

translating information collected from each individual storage device into data applicable to the entire pool; and when the storage device does not automatically report its configuration information to the software module at the host system in response to the query, generating data that is not obtainable from an individual storage device and data that is difficult to extrapolate to a pool basis.

18. The computer program product of claim 17, further comprising program code for:

translating all application I/O requests directed to the pool into its physical device components; and forwarding the appropriate request to each individual storage device.

19. The computer program product of claim 13, further comprising program code for:

statistically timing and tracking I/O requests to the individual storage devices in order to compute storage device characteristics, including average I/O latencies and average sustained I/O throughput to the pool; and querying the manager to obtain the collected and calculated configuration data for a selected storage pool.

20. The computer program product of claim 19, further comprising program code for:

providing an interface for access by applications and system administrators to the configuration data, such that (1) each application is able to query the interface to automatically match functions to the appropriate storage pool;

presenting the information to the system administrators for manually matching functions to storage pools; and automatically assigning permissions to the interface to enable said interface to be accessible to all host system applications with said appropriate permissions.

* * * * *